United States Patent
Billiet et al.

(10) Patent No.: US 6,709,622 B2
(45) Date of Patent: Mar. 23, 2004

(54) POROUS NANOSTRUCTURES AND METHOD OF FABRICATION THEREOF

(76) Inventors: Romain Billiet, 135 A Malacca Street, Penang (MY), 10400; Hanh T. Nguyen, 135 A Malacca Sreet, Penang (MY), 10400

(*) Notice: Subject to any disclaimer, the term of this patent is extended or adjusted under 35 U.S.C. 154(b) by 0 days.

(21) Appl. No.: 10/101,033

(22) Filed: Mar. 11, 2002

(65) Prior Publication Data

US 2002/0167118 A1 Nov. 14, 2002

Related U.S. Application Data

(60) Provisional application No. 60/279,075, filed on Mar. 23, 2001.

(51) Int. Cl.$^7$ .............................................. C04B 33/32
(52) U.S. Cl. ............................ 264/432; 264/628; 419/2
(58) Field of Search ................................ 264/628, 432; 419/2

(56) References Cited

U.S. PATENT DOCUMENTS

| | | |
|---|---|---|
| 3,910,851 A * | 10/1975 | Messing ..................... 252/455 |
| 3,963,504 A | 6/1976 | Lundsager |
| 5,242,595 A | 9/1993 | Morgart et al. |
| 5,266,207 A | 11/1993 | Boye et al. |
| 5,696,217 A | 12/1997 | Dismukes et al. |
| 5,780,186 A * | 7/1998 | Casey, Jr. ................... 429/229 |
| 5,852,088 A | 12/1998 | Dismukes et al. |
| 6,171,687 B1 | 1/2001 | Leung et al. |
| 6,180,222 B1 | 1/2001 | Schulz et al. |

* cited by examiner

*Primary Examiner*—Christopher A. Fiorilla
(74) *Attorney, Agent, or Firm*—Foley & Lardner

(57) ABSTRACT

A method of fabricating nanostructures containing isotropically distributed, interconnected pores having cross-sectional diameters in the nanometer and Angstrom range by integrating the steps of attriting precursor nanometer-sized particulate materials, desorbing the exposed surfaces of the attrited nanoparticulates, adsorbing a surfactant on 25–50% of the desorbed surfaces and dispersing the surfactant-coated nanoparticulates in an organic matrix to form a homogeneous thermoplastic compound from which green nanostructures are formed, dewaxed and sintered to the desired degree of microporosity.

16 Claims, No Drawings

POROUS NANOSTRUCTURES AND METHOD OF FABRICATION THEREOF

CROSS-REFERENCE TO RELATED APPLICATIONS

This application claims priority to U.S. Provisional Application Ser. No. 60/279,075 filed on Mar. 23, 2001.

This invention is related to U.S. patent application Ser. No. 09/962,526 entitled: 'Method For Controlling The Dimensions Of Bodies Made From Sinterable Materials' and to Provisional Patent Application Ser. No. 60/270,180 entitled: Method For Making Articles From Nanoparticulate Materials.

REFERENCES CITED

U.S. Patent Documents

| 3,963,504 | June 1976 | Lundsager | 501/82 |
|---|---|---|---|
| 5,104,546 | April 1992 | Filson, et al. | 210/650 |
| 5,242,595 | September 1993 | Morgart, et al. | 210/636 |
| 5,266,207 | November 1993 | Boyce, et al. | 210/653 |
| 5,696,217 | December 1997 | Dismukes, et al. | 528/10 |
| 5,852,088 | December 1998 | Dismukes, et al. | 524/175 |
| 6,171,687 | January 2001 | Leung, et al. | 428/304.4 |
| 6,180,222 | January 2001 | Schulz, et al. | 428/317.9 |

STATEMENT REGARDING FEDERALLY SPONSORED RESEARCH OR DEVELOPMENT

Not Applicable.

REFERENCE TO A MICROFICHE APPENDIX

Not Applicable.

BACKGROUND—FIELD OF INVENTION

The present invention relates to the fabrication of articles from nanoparticulate materials containing isotropically distributed, interconnected pores with cross-sectional diameters in the nanometer and Angstrom range.

BACKGROUND—DESCRIPTION OF PRIOR ART

Organic and inorganic porous materials play an important role in a number of processing industries such as chemical recovery, purification and dehumidification. Porous ceramic oxides (e.g., clays, silica and zeolites) are used as catalysts or catalyst supports in chemical and petroleum reactions such as hydrocracking, hydrodesulfuration, reforming and polymerization. The high chemical, mechanical and thermal resistance of inorganic membranes makes them attractive in the field of ultrafiltration and absorption drying (e.g. wicking in powder injection molding technology).

As modern technology developments take place at an ever increasing pace, there is a growing demand for materials with controlled microporosity or nanoporosity, to be used in a variety of technologically advanced and highly specialized applications.

For example, attitude control rocket engines used on interplanetary spacecraft such as the Cassini Jupiter space probe, draw argon through flow controllers made from microporous metallic filters.

In the medical field, metallic and ceramic structures with controlled porosity are used as building blocks in tissue engineering, bone grafts, surgical implants, bacterial filters and drug delivery systems.

In the microelectronics industry, as the density of functional elements in integrated circuits increases, the need for improved on-chip interconnections becomes more acute. Such interconnections generally consist of multiple layers of metallic conductor lines embedded in low dielectric constant materials. To reduce capacitive effects leading to cross talk between conductor lines, and to allow for lower voltages to be used to power integrated circuits, materials with low dielectric constants, i.e., typically below 2.5, are desirable as they allow faster signal velocity and shorter cycle times. This has led to the development of dielectric materials with designed-in nanoporosity.

In the field of energy storage and conversion, the ability to tailor the composition, shape and porosity of anodes, cathodes and electrolytes produced from complex metallic, ceramic and cermet compositions, plays an important role in the development and design of low-cost, high efficiency solid oxide fuel cell (SOFC) systems.

In the field of photonics, nano-sized, highly-ordered three-dimensional open porosity structures are potentially useful as photonic bandgaps and optical stop-bands which can be used to fabricate new types of diffractive optical sensors with enhanced sensitivities.

Generally, porous materials are produced in the form of thin layers, films or membranes. The prior art has devised a number of methods for producing such kinds of membranes, e.g. electrochemical etching of alumina or silicon, chemical etching of glasses, ion-track etching of polymers and self-assembly of block copolymers. Methods based on selective etching usually generate straight, one-dimensional channel structures and have been very successful in the manufacture of commercial membrane films. Methods based on self-assembly of block copolymers provide an elegant and efficient route to macroporous films with a regular array of spherical pores. Although these pores are fully opened on the surfaces of the film, they are isolated from each other in the bulk.

In one approach, small hollow glass spheres are introduced into a material. Examples are given in Kamezaki, U.S. Pat. No. 5,458,709 and Yokouchi, U.S. Pat. No. 5,593,526. However the use of small hollow glass spheres is typically limited to inorganic silicon-containing polymers.

In another approach, a thermostable polymer is blended with a thermolabile (thermally decomposable) polymer. The blended mixture is then crosslinked and the thermolabile portion thermolyzed. Examples are set forth in Hedrick et al., U.S. Pat. No. 5,776,990. Alternatively, thermolabile blocks and thermostable blocks alternate in a single block copolymer, or thermostable blocks and thermostable blocks carrying thermolabile portions are mixed and polymerized to yield a copolymer. The copolymer is subsequently heated to thermolyze the thermolabile blocks. However, many difficulties are encountered utilizing mixtures of thermostable and thermolabile polymers and the distribution and pore size of the nanovoids is difficult to control.

In yet another approach, a polymer is formed from a first solution in the presence of microdroplets of a second solution, where the second solution is essentially immiscible with the first solution. During polymerization, microdroplets are entrapped in the forming polymeric matrix. After polymerization, the microdroplets of the second solution are evaporated by heating the polymer to a temperature above the boiling point of the second solution, thereby leaving nanovoids in the polymer. However, generating nanovoids by evaporation of microdroplets tends to be an incomplete process that may lead to undesired outgassing and potential retention of moisture and employing microdroplets to generate nanovoids often allows little control over pore size and pore distribution.

In yet another prior art method, Schulz, et al., U.S. Pat. No. 6,180,222, generate nanoporous aluminum oxide layers or membranes by anodic oxidation of aluminum anodes in an electrochemical cell in which the electrolyte is usually sulfuric or oxalic acid. Pore diameter is controlled by precisely monitoring the electrolyte composition and temperature as well as the anodizing voltage, the pore diameter increasing as the voltage increases. If a nanoporous membrane is the desired end product, the non-oxidized part of the aluminum anode is machined away or dissolved in an acid bath.

In yet another method of the prior art, Morgart, et al., U.S. Pat. No. 5,242,595 disclose a method of fabricating composite membranes on a porous support structure, usually alpha alumina. In another prior art invention, Boye, et al., U.S. Pat. No. 5,266,207 disclose a technique to fabricate a composite membrane consisting of several layers of oxide of decreasing particle size deposited on a porous tubular support made of carbon or alumina.

Organic nanofiltration membranes present the disadvantage of being mechanically and thermally fragile and sensitive to chemical attack. While porous oxide membranes offer a number of advantages over polymeric membranes such as higher operating temperature ranges, greater structural integrity and improved resistance to corrosion, advanced material compositions are still required for applications under highly specific operational and environmental conditions requiring improved resistance to mechanical impact and thermal shock, water and oxygen resistance, and molecular selectivity to small molecules and gases.

Ceramic materials of the silicon carbide, silicon nitride, silicon aluminide, boron nitride, and related types offer many of the properties needed for advanced applications, however, the sol-gel synthesis methods typically used to prepare porous oxide membranes or catalyst supports are incompatible with the preparation of these because of the need to use water in their preparation. Sintering or reactive sintering of these ceramics likewise produces materials with pore sizes of from about 0.1 to about 1000 microns which are non-uniform and generally too large for effective molecular separation.

Recently, porous silicon carbide and silicon nitride ceramics have been prepared by pyrolysis at temperatures of 1300° C. and higher of ceramic precursors, e.g., polycarbosilanes, polysilanes, polycarbosiloxanes, polysilazanes, etc. During pyrolysis, various gaseous decomposition species such as hydrogen and organic compounds are liberated. These gases tend to coalesce as the preceramic precursor crosslinks and hardens, resulting in a lower density ceramic having a macroporous closed-cell structure.

In Dismukes, et al., U.S. Pat. Nos. 5,696,217 and 5,852,088 the synthesis of microporous and nanoporous ceramics with catalytic functionality by ammonia pyrolysis of ceramic precursors is described.

Chemical vapor deposition techniques are also used to produce microporous ceramic layers, but this tends to be an expensive, high temperature process with limited ability to tailor complex ceramic compositions.

In all the above methods, the limitation in the selection of materials, the thinness of the membrane films and the poor control over the size and distribution of pores, are generally viewed as major drawbacks. Also the deposition/etch techniques restrict design complexity while most of the above processes are not readily amenable to mass production.

BRIEF SUMMARY OF THE INVENTION

In accordance with the present invention the problems of the prior art are substantially overcome by providing a method to fabricate complex three-dimensional structures with isotropically distributed, interconnected, controlled nanoporosity. As used herein, the term nanoporosity refers to porosity in which the mean width (diameter) of the pores is in the nanometer or even Angstrom range.

OBJECTS AND ADVANTAGES

It is a primary object of this invention to overcome the dimensional and design limitations of the prior art in the preparation of porous nanostructures by providing a method to fabricate net-shape porous nanostructures with design features such as deep holes, rounded shapes, angled slots, threaded holes, etc.

It is a second object of this invention to overcome the material limitations of the prior art in the preparation of porous nanostructures by providing a method to fabricate net-shape porous nanostructures from a variety of materials including metals, ceramic, cermets, etc.

It is yet another object of this invention to provide a method to fabricate homogeneous porous nanostructures in which the amount and size of initial or starting porosity can be accurately preset and from there the degree and morphology of the porosity can be precisely achieved.

It is still another object of this invention to provide an economic manufacturing process for porous nanostructures which lends itself easily to automation and mass-production and makes use of well-known prior art techniques such as casting, machining, molding, sintering, etc. It is therefore also an object of this invention is to provide a manufacturing method for porous nanostructures which is easily accessible to the manufacturing industry instead of being restricted to specialized industries, laboratories and academic establishments.

BRIEF DESCRIPTION OF THE SEVERAL VIEWS OF THE DRAWINGS

Not applicable.

DETAILED DESCRIPTION OF THE INVENTION

The first step, in the application of the present invention, consists of providing raw precursor particulate materials that conform as closely as possible to the desired end specification of the nanoparticulates needed to build the nanostructures in terms of composition, morphology, granulometry, absence of aggregation, contamination, etc.

The raw precursor particulate materials may be made up of a single material, such as a ceramic or a metallic powder, or several different ceramic or metallic materials, either in elemental or prealloyed form, or mixtures of these. The main directives in selecting the type of raw precursor particulate materials will be the material composition of the desired porous nanostructure.

The next step consists of mechanically milling or attriting a predetermined volume of raw precursor particulate materials under a protective blanket of a nonaqueous organic heavy liquid, selected on the basis of its high density, low viscosity, low surface tension, chemical inertness, low cost, low toxicity, and safety of use. Examples of organic heavy liquids are given below, together with their respective density in g/cm$^3$:

| Dichloromethane (methylene chloride) | $CH_2Cl_2$ | 1.325 |
| --- | --- | --- |
| Chloroform | $CHCl_3$ | 1.492 |
| Carbon tetrachloride | $CCl_4$ | 1.594 |
| Diiodomethane | $CH_2I_2$ | 3.325 |
| Tetrabromoethane (TBE) | $C_2H_2Br_4$ | 2.950 |
| Trichloroethylene (TCE) | $C_2HCl_3$ | 1.460 |
| Trichlorotrifluoroethane | $C_2Cl_3F_3$ | 1.560 |
| Tetrachloroethylene (perchloroethylene) | $C_2Cl_4$ | 1.623 |

The ball mill or attritor charge will normally consist of the proper type and quantity of grinding media, usually ceramic balls or pebbles, the raw precursor particulate materials to be milled, and an appropriate volume of a protective organic heavy liquid. Following closure of the ball mill or attritor the supernatant volume of air inevitably present in the ball mill or attritor is displaced with an inert gas.

During the ball milling or attriting step, the raw precursor particulate materials are comminuted while any aggregates will be systematically broken down by the severe mechanical shearing action. Moisture or other contaminants such as gases or volatiles adsorbed onto the surface of the particulates will be dislodged and tend to collect at or above the surface of the organic heavy liquid.

The duration and intensity of the ball milling or mechanical attrition action will determine the final particle size distribution of the nanoparticulates which, in turn, will have a decisive effect on the density of the nanopores and their average width (diameter). The basic rule of thumb is that the smaller the particulates the smaller will be the average width (diameter) of the nanopores and the higher will be the nanopore density. Hence, after an empirically determined time, corresponding to the point where the desired particle size has been attained, the ball milling or mechanical attrition action is stopped, interrupted or slowed down to allow dislodged gaseous contaminants to coalesce, collect or condense at or above the surface of the organic heavy liquid where they can be easily siphoned off or displaced by a stream of inert gas.

The supernatant gases and coalesced or condensed contaminants can also be drawn off by applying a vacuum, and their volume replaced with additional organic heavy liquid. Alternatively the deaggregated and comminuted nanoparticulate materials can be transferred to another vessel filled with the organic heavy liquid. Whatever the method used, the end objective of this process step is to isolate the deaggregated and comminuted nanoparticulates from atmospheric contaminants.

In the next step of the application of this invention the organic heavy liquid is pumped off and any residual organic heavy liquid removed by vacuum distillation. The use of vacuum at this stage is necessary to allow the desorption process to proceed to completion. Usually this requires a pressure of less than $10^{-6}$ Torr. When the base pressure stabilizes the desorption step will be completed.

Now that the first objective in the application of this invention, i.e. the preparation of nanoparticulates having the proper granulometry and clean desorbed surfaces, has been attained, it is opportune to outline the principles governing the remaining steps of the methodology pursued, bearing in mind that the ultimate goal is the fabrication of end products of the desired shape and having a precise amount of controlled nanoporosity.

This objective can be met by first dispersing a measured volume of the nanoparticulates in a measured volume of an organic thermoplastic matrix or binder, to yield a thermoplastic compound from which green parts can be shaped via any suitable plastic shaping technique such as casting, injection molding, laminating, extrusion, etc. Following extraction of the organic binder from the green parts, same can be sintered under optimum conditions to end up in the desired porous nanostructures.

The use of a thermoplastic matrix or binder has several important benefits, essential for the successful application of this invention.

Firstly, it allows the nanoparticulate materials to be shaped like a plastic. Thin walled parts as well as complex shapes with undercuts, threaded holes, etc., can be easily achieved. Prior art limitations in shaping ability are thus entirely overcome.

Secondly, a homogeneous dispersion means that the macrodensity of the nanoparticulates in the green part will be substantially isotropic, i.e. there will be no density gradients. Conversely, the macrodensity of the organic thermoplastic binder in the green part will likewise be isotropic. As a result, the initial open or interconnected 'starting' porosity, i.e. the void space created when the organic thermoplastic matrix has been extracted from the green part, will also be entirely isotropic. This is a decisive prerequisite to achieving porous nanostructures with homogenous pore density as it is impossible to end up with porous nanostructures having isotropic porosity if the starting porosity is already anisotropic.

Thirdly, since the volume of the thermoplastic binder is known with great precision, so will be the volume of the initial open porosity. Hence, by controlling the volume of the thermoplastic binder one can control the amount of initial open porosity imparted to the structure. Hence the amount of 'starting porosity' is now placed entirely in the hands of the practitioner of the present invention.

Fourthly, the volume of thermoplastic binder has a direct bearing on the size, uniformity and macrodensity of the nanopores. Clearly the nanoporosity will be more uniform, the pore density (number of pores per unit volume) will be higher and the pores will be smaller in size if the number of contact points between nanoparticles is maximized, or its converse, if the volume of thermoplastic binder is minimized. The ability to minimize the volume of thermoplastic binder is one of the major objectives of this invention.

Fifthly, the volume of thermoplastic binder also has a direct bearing on the strength of the porous nanostructure. This is a consequence of maximizing the number of contact points between nanoparticles. When sintering is initiated, neck growth will take place at the points of contact between contiguous particles and will be allowed to proceed until the desired nanoporosity is achieved. The size of the necks formed at that particular point in time will determine the nanostructure's tensile strength since the latter is but the integration over the entire cross-section of the porous nanostructure of the tensile strengths of all the individual necks formed. Clearly, the more necks, the higher the tensile strength.

Sixthly, the volume of thermoplastic binder furthermore has a direct bearing on the shrinkage of the porous nanostructure during sintering. It is generally accepted that mass transport during sintering of two contiguous particles takes place in successive stages.

The initial sintering stage is characterized by rapid growth of the interparticle neck through material transport from surface sites to the neck area by surface diffusion, evaporation-condensation, and volume diffusion phenomena. During this early stage of sintering there is no significant if any particle center to particle center movement, hence no appreciable part shrinkage occurs at that time. However neck formation is concomitant with a rapid reduction in surface area. Prior to the outset of sintering the initial surface area is essentially that of the nanoparticulate materials in the green part. In the early portion of sintering the original surface area declines rapidly and there is good correlation between the growth of the neck diameter and the loss of surface area. The loss of surface area and the ensuing change in pore morphology (size, shape and connectivity) can be measured by several techniques such as optical or electron microscopy, gas adsorption, bubble point tests or mercury porosimetry. The latter is applicable to pores as small as 1 nm.

During the intermediate stage of sintering, the pore structure becomes smooth and develops an interconnected, approximately cylindrical shape. The concomitant reduction in curvature and surface area results in slower sintering. It is common for grain growth to occur in the latter portion of the intermediate stage of sintering, giving a larger average grain size with fewer grains. For porous nanostructures the end point lies somewhere between the formation of interparticle necks that are compatible with acceptable tensile strength of the porous nanostructure and the end of the intermediate sintering stage. Hence, for each specific case in the practical application of this invention, the endpoint will be controllable by surface area measurements.

The final stage of sintering is entered into when the open pore network becomes geometrically unstable and the elongated pores collapse and pinch off into lenticular or spherical pores. This final stage is not relevant to this invention and is only mentioned for the sake of completeness.

Having thus emphasized the importance of minimizing the volume of thermoplastic binder in the green part, the next step in the application of this invention is to achieve this condition.

Dispersions of particulates in an organic matrix or binder are characterized by the volumetric ratio of the discrete phase—in this case the nanoparticulate materials—to the total volume of the dispersion—in this case the thermoplastic matrix or binder. This ratio, usually termed the volumetric loading, volume occupancy or simply the loading of the dispersion, is designated by the Greek letter $\Phi$. Minimizing part shrinkage during sintering, therefore, equates to maximizing $\Phi$.

In a theoretical situation of uniform spherical particles—often dubbed the canon ball theory—the maximum volume occupancy, $\Phi_{max}$, is achieved when the particles are orderly stacked in a close-packed arrangement, corresponding to a volume fraction of approximately 0.74. In a real world environment however, this idealized situation is unlikely to ever occur as the particles will neither be spherical nor uniform. Also, in the case of a wide particle size distribution or a multimodal distribution, i.e. a mixture of particle populations with different particle size distributions—smaller particles may lodge between bigger ones and $\Phi_{max}$ can thus substantially exceed the value of 0.74 as a result of interstitial filling.

For each specific situation, therefore, a condition known as the most probable volume fraction, $\Phi_m$, exists. This is the volume the particles will attain when they are being uniformly compressed in the dispersion as in the case of sedimentation and, for this reason, $\Phi_m$ is also termed the most probable sedimentation volume. As the particles begin to contact each other during sedimention they will form a structure that will eventually prevent further compression. When the particles are in this condition they are at $\Phi_m$. As no direction is given to any of the particles while they are being compressed, i.e. the compression is random, the final structure can be any one of a large number of discrete configurations, each corresponding to a particular value of $\Phi_m$. Hence, the problem of minimizing the shrinkage upon sintering now reduces to maximizing $\Phi_m$.

However, maximizing $\Phi_m$ for dispersions of extremely small particulates such as nanopowders is very difficult due to the high surface activity of these materials. Also the dispersion must retain acceptable rheology so as to allow subsequent shaping of green parts. When $\Phi_m$ increases so will the viscosity of the dispersion and, at a certain point, become impractical for shaping green parts.

When particle size is reduced to the nanometer scale and the distance between particles is of the same order of magnitude or even smaller, the effect of the net attractive van der Waals intermolecular forces must be taken into account when attempting to maximize $\Phi_m$ as these forces are responsible for particle aggregation and thus have a profound and often decisive effect on $\Phi_m$ and the processibility of nanoparticulate dispersions.

The effect of the van der Waals attractive forces is best illustrated by the well known Lennard-Jones curve, which gives the potential energy between particles as a function of interparticulate separation. Attraction due to van der Waals forces decreases very slowly with increasing particle separation and, at a distance in excess of 10 nm, becomes weak enough to be negligible. The opposite situation is attained when particles move together within atomic proportions, at which moment strong electrostatic repulsive conditions prevail. Between these two extremes the Lennard-Jones potential energy curve goes through several maxima and minima (energy wells) depending on a number of variables specific to the surface conditions of the nanoparticulates and the continuous phase between them. At the minima of potential energy, the nanoparticles will find themselves at an equilibrium distance and either moving them closer to each other or further away from each other will require an input of energy. It is at such minima that a dispersion of nanoparticulates in an organic matrix will form stable aggregates. The stability of such aggregates will be proportional to the magnitude of the minima in the Lennard-Jones curve, i.e. the 'deeper' the potential energy well, the more stable the aggregates will be.

Since aggregates behave like particles, the most probable maximum packing volume $\Phi_m$ of any dispersion will be dramatically affected by the degree of aggregation of the system. It is clear that, in order to break down aggregated nanoparticulates, the mechanical energy input, such as the shearing action from ball milling or mechanical attrition, must be sufficient to overcome the potential energy minima. If the energy input is interrupted or insufficient, the particulates may be moved a short distance away from their equilibrium position, i.e. the aggregates may momentarily de-aggregate, but they will soon re-aggregate. Since it is always possible to provide sufficient energy for de-aggregation, the key to success resides in preventing re-aggregation. It is one of this invention's objects to provide this key and thus, indirectly, to control the van der Waals forces acting on the particles in the dispersion.

The technique consists of coating 25–50% of the surface of the nanoparticles with a monolayer of surfactant molecules immediately after the aggregates have been broken down by the mechanical milling action and the surfaces of the nanoparticulates are desorbed. When a monolayer of surfactant molecules is adsorbed onto the surface of the adsorbent, the atomic radius of surface atoms in contact with the adsorbate increases, sometimes by as much as 20%, and these absorbent atoms are no longer able to assume the equilibrium position they occupied during nanoparticle aggregation.

The method used to select the type of surfactant and to determine the optimum amount of surfactant will now be disclosed. It will be remembered from surface adsorption theory that a distinction is usually made between two different types of adsorption: physical or van der Waals adsorption, also termed physisorption, and chemical adsorption or chemisorption.

In physisorption, the London—van der Waals mutual forces of attraction cause the adsorbing (adsorbate) molecules to be attracted to and held in the vicinity of the adsorbing (adsorbent) surface (adsorbent). Physisorption does not stop when a single layer of molecules has been adsorbed but continues through many stacked layers of adsorbed molecules.

Chemisorption initially proceeds in the same manner as physisorption except that the adsorbate and adsorbent are chemically reactive. Thus the first monolayer of chemisorbed molecules is, for all practical purposes, the total extent of chemisorption, and any succeeding layers are physisorbed. Like any other chemical reaction chemisorption requires a minimum activation energy. The general rule is that low temperature (under the boiling temperature of the adsorbate) indicates physisorption, intermediate temperature indicates chemisorption, and high temperature indicates desorption. For example, CO gas will physically adsorb on a given adsorbent at 80° K. When the temperature is increased to 350° K. it will chemisorb and at 1200° K. it will desorb. Temperature is, therefore, one of the important parameters in controlling the type of adsorption.

Chemisorption is also highly specific because it is a chemical reaction. A given adsorbate may readily chemisorb on an adsorbent under one set of conditions and may not chemisorb at all under a slightly different set of conditions. Physisorption, on the other hand, takes place on all surfaces under the right temperature-pressure conditions, being essentially independent of the chemical nature of the adsorbate. It has been found that the heat of physical adsorption is always near the heat of liquefaction of the adsorbate.

Hence, in the application of this invention, upon completion of the vacuum distillation step, as indicated by a stable base pressure, a predetermined volume of a suitable surfactant is admitted into the ball mill, attritor or vessel, and allowed to physisorb onto the surface of the nanoparticulates. This obviously implies that the nanoparticulates be maintained at a vacuum level below the vapor pressure of the surfactant—which will inherently be the case if the surfactant is admitted into the ball mill, attritor or vessel containing the desorbed comminuted nanoparticulates, immediately following the desorption step—and at a temperature at which physisorption will occur.

The choice of a specific surfactant is made on the basis of minimizing the c constant in the BET isotherm. It may be opportune, at this stage, to recall that the BET isotherm is usually written as:

$P/v(P_o - P) = (1/v_m c) + [(c - 1)/v_m c] \cdot P/P_o$ where  $P$  is the system pressure
  $P_o$  is the saturation vapor pressure of the condensed adsorbate
  $V$  is the volume of gas adsorbed
  $V_m$  is the volume of a monolayer of the adsorbate
  $c$  is a constant that depends on the net heat of adsorption such that:
    $c \sim \exp(\Delta H_a - \Delta H_d)/RT$
    where  $\Delta H_a$  is the enthalpy of adsorption (condensation)
      $\Delta H_d$  is the enthalpy of desorption (evaporation)
      $R$  is the gas constant
      $T$  is the absolute temperature of adsorption Since the BET isotherm in its above form is a linear equation, a plot of $P/v(P_o-P)$ against $P/P_o$ gives a straight line. The ratio of its slope to its intercept is $(c-1)$ so that c can be readily evaluated from experimental data.

Although the BET isotherm is primarily used to measure the surface area of particulate materials and, to this effect, an inert gas such as nitrogen, helium, xenon, krypton, ethylene, etc. is generally used as the adsorbate, the technique can also be used with many other gaseous molecules such as oxygen, alcohols, mineral oils, fatty acids, etc. For any given particulate material used as an adsorbent, an adsorbate-specific constant c can be derived from the corresponding BET isotherm.

Results obtained with an aluminum powder having an average particle size of 6 $\mu$m are given below:

| Adsorbate | Value of c (BET) | $\Phi_m$ |
| --- | --- | --- |
| None (desorbed aluminium surface) | 800 | 0.30 |
| Oxygen | 80 | 0.45 |
| Isopropyl alcohol ($C_3H_7OH$) | 35 | 0.55 |
| Phospatidylcholine | 23 | 0.63 |

As can be seen from above tabulation, when the clean aluminium powder is coated with a monolayer of phospatidylcholine, $\Phi_m$ jumps from 0.30 to 0.63, a 110% improvement. Further studies have also shown that it is not necessary to coat the entire surface of the nanoparticles with a monolayer of surfactant. When only 25% of the surface receives a monolayer of surfactant $\Phi_m$ is already significantly higher than if no surfactant is adsorbed, and when about 50% of the surface is coated with a monolayer of surfactant $\Phi_m$ reaches a maximum.

The minimum volume of surfactant to be adsorbed can be determined on the basis of the specific surface area of the comminuted nanoparticulate materials, as measured by the BET method, so that at least 25% and at most 50% of the adsorbent's surface will be covered with a monolayer of adsorbate molecules.

When the nanoparticulates have been coated by the surfactant in accordance with above teachings, they can be dispersed in a predetermined volume of the organic matrix or binder. The thermoplastic matrix or binder is made up of at least one thermoplastic organic material though generally it will be made up of several different organic constituents which may include polyolefin resins, silicones, waxes, oils, greases and the like. In most cases various organic plasticizers and antioxidants will also be included to optimize the characteristics of the thermoplastic matrix and to avoid or retard its premature oxidative degradation. Usually the binder will be specifically formulated for a given discrete phase to optimize the thermoplastic compound's rheological properties and the thermal decomposition pattern of the organic binder. Anyone skilled in the art will be well aware of the number of combinations and permutations possible at this point to obtain the desired characteristics of the organic binder. Enumerating such possibilities would not materially contribute to the description of this invention. However, a typical formula for the organic matrix would be approximately one-third by weight of polyethylene, one-third by weight of paraffin wax, one-third by weight of beeswax with perhaps 0.05% of an antioxidant added.

The surfactant-coated nanoparticulates and the thermoplastic matrix or binder are admixed under a protective oxygen-free atmosphere at a temperature in excess of the melting point or flow point of the thermoplastic matrix but below the temperature at which sintering of the nanoparticles will be initiated. Techniques for producing thermoplastic compounds are well described in the prior art and will not be elaborated on here.

The thermoplastic or green compound is formulated in such way that it is a solid at or below the normal room temperatures prevailing in temperate climates, i.e. usually below 25° C. At such temperatures the green compound can be machined by well-known techniques such as milling, drilling, turning, reaming, punching, blanking, sawing, cutting, filing, etc.

The organic binder is further formulated in such way as to be extractable from the thermoplastic compound using well-known techniques such as solvent extraction, oxidative degradation, catalytic decomposition, vacuum distillation, wicking and the like, leaving behind a framework that is substantially devoid of organic material and consisting only of the particulates of the discrete phase, coherently held together by the net attractive van der Waals forces. At this point in the process the shape is extremely fragile. The binder-free porous nanostructure is then sintered to the desired degree of porosity.

While the discussion of the specific embodiments of the invention will be provided mainly through the examples given below and involve materials such as zirconia (zirconium oxide) and TZM (titanium-zirconium-molybdenum alloy), the invention also applies to other metals, ceramics, cermets and alloys and many other sinterable materials.

EXAMPLE I 4,906 g of spray dried zirconia powder stabilized with 3 mol Y2O3, grade TZ-3Y from Daiichi Kigenso K.K. Co., Ltd., having an average particle size of 0.3 micrometers and specific surface area of 14 m2/g was loaded in a closed circuit attriting installation consisting of a 2.6 gallon zirconia-clad attritor, made by Union Process, filled with 1.0 mm diameter zirconia grinding balls, and communicating with a 5 gallon circulating tank. A slurry pump mounted between the attritor and the circulating tank allowed transfer from the former to the latter.

After sealing the attritor and circulating tank, trichloroethylene (TCE) from a solvent storage tank was allowed to fill the circulating tank by gravity to a level controlled by a float valve. A 16 liter per minute flow of dry, purified argon gas was continuously passed through the upper part of the circulating tank and attritor in order to displace any supernatant air above the TCE level. After 30 minutes of argon flushing, the attritor motor was started and the slurry pump flowrate adjusted to 4 liters per minute.

The milling operation was allowed to proceed under argon blanket for 18 hours, this period having been empirically determined to yield an average particle size of 30 nanometers.

Upon completion of the attrition step, part of the slurry pump discharge was diverted to the jacketed trough of a 1 gallon explosion-proof planetary mixer on which a pressure of about 10 mm Hg was being maintained by means of a vane pump. A condenser installed between the solvent trough and the vacuum pump allowed solvent vapors to be condensed. The resulting condensate was pumped back to the solvent storage tank, thereby closing the circuit.

After one hour of operating in this manner the slurry pumping rate was increased to 8 liters per minute in order to speed up the flushing of the circulating tank and holding tank. After another hour of operating in this manner substantially all of the zirconia slip had been transferred to the mixing trough and the discharge of the slurry pump was clear as indicated by turbidimeter reading.

The mixing trough was then valved off and placed under a high vacuum until a stable base pressure of $10^{-6}$ Torr was reached. At that moment a measured quantity of 1.79 g of phospatidylcholine was automatically dispensed into the mixing trough where it was allowed to adsorb onto the dried slip, said quantity having been determined experimentally so as to coat 25–50% of the surface of the nanoparticulates with an adsorbed monolayer of phosphatidylcholine molecules.

After a few minutes of further mixing, argon gas was allowed into the mixing trough until a partial pressure of about 200 mm Hg was reached. Concurrently, hot oil was circulated through the mixing trough's heating jacket and a measured quantity of 369 g of paraffin wax and 416 g of polyethylene was automatically dispensed into the mixing trough. After one hour of mixing at a constant temperature of 150° C., as indicated by a thermocouple installed inside the mixing trough, the mixture displayed a homogeneous creamy texture and was extruded through a valve in the bottom of the mixing trough by increasing the argon pressure in the latter.

The extruded mixture was cooled, granulated, and molded into green parts with overall dimensions of 20.28 mm×12.17 mm×1.01 mm. The thermoplastic binder was then extracted from the green parts in accordance with prior art practice, upon which the part dimensions remained unchanged. Surface area determination by BET method yielded 95 m2/g, which was substantially identical to the surface area of the milled nanoparticulates. True density measurement by helium pycnometry yielded 6.05 g/cm3, which was also substantially identical to that of the raw material. Following sintering in a microwave oven at 600° C. for 18 minutes the parts had shrunk to 20 mm×12 mm×1 mm, which were the desired final dimensions. Surface area measurement after sintering yielded 60 m3/g. The pore volume had reached the predicted value of 49% and average pore size was determined to be in the 10–50Å range.

EXAMPLE II

As no commercial powder of TZM, a molybdenum alloy of nominal composition Mo-0.5Ti-0.1Zr, could be found in the market, bar stock and machining scrap were ground and subsequently ball milled under inert atmosphere until comminuted into a powder with a particle size distribution of 90% minus 50 μm and a specific surface area of 1.6 m2/g.

8,253 g of this powder was loaded in a closed circuit attriting installation in all ways identical to the one described in above Example I, except that, in this case, the grinding media were replaced by 2.0 mm diameter zirconia grinding balls.

The grinding procedure was in every way identical to the one described in Example I with the only difference being the milling time, which was 12 hours, this period having been empirically determined to yield an average particle size of 50 nanometers. Upon completion of the attrition step, part of the slurry pump discharge was again diverted to the mixing trough until the discharge of the slurry pump was clear as indicated by turbidimeter reading.

The mixing trough was then again valved off and placed under a high vacuum until a stable base pressure of $10^{-6}$ Torr was reached. At that moment a measured quantity of 467 mg of phospatidylcholine was automatically dispensed into the mixing trough where it was allowed to adsorb onto the dried powder, said quantity having been determined experimentally so as to coat 25–50% of the surface of the nanoparticulates with an adsorbed monolayer of phosphatidylcholine molecules.

The rest of the procedure was essentially identical to that of Example I with the difference that, upon reaching the partial pressure of about 200 mm Hg in the mixing trough, a measured quantity of 343 g of paraffin wax and 369 g of polyethylene was automatically dispensed into the mixing trough. After one hour of mixing at a constant temperature of 150° C., as measured by a thermocouple installed inside the mixing trough, the mixture displayed a homogeneous creamy texture and was extruded through a valve in the bottom of the mixing trough by increasing the argon pressure in the latter.

The extruded mixture was cooled, granulated, and molded into green parts with overall dimensions of 20.28 mm×12.17 mm×1.01 mm. The thermoplastic binder was then extracted from the green parts in accordance with prior art practice, upon which the part dimensions remained unchanged. Surface area determination by BET method yielded 48 m2/g, which was substantially identical to the surface area of the milled nanoparticulates. True density measurement by helium pycnometry yielded 10 g/cm3, which was substantially identical to that of the raw material. Following sintering in a vacuum furnace at 800° C. for 25 minutes the parts had shrunk to 25 mm×12 mm×3 mm, which were the desired final dimensions. Surface area measurement after sintering yielded 60 m3/g. The pore volume had reached the predicted value of 49% and pore size was determined to be in the 10–50Å range.

Microwave sintering is a preferred embodiment of this invention because of this technique's unique ability to provide rapid isotropic heating whereas, with induction heating, the heat transfer follows a diffusion equation proceeding from the heating elements towards the center of the parts. The fast heating rate provided by the microwaves results in rapid neck formation by surface diffusion and evaporation condensation phenomena at the interparticulate contact sites. As soon as this objective is attained the heating can be instantly interrupted before neck growth by bulk diffusion is initiated. Additionally, the fast neck formation rendered possible by the use of microwave energy precludes undesirable grain growth.

Monitoring of the neck growth by BET surface area measurement is also a preferred embodiment of this invention. As was explained earlier, neck formation is concomitant with a rapid reduction in surface area and, in the early portion of sintering the original surface area declines rapidly and there is good correlation between the growth of the neck diameter and the loss of surface area. The loss of surface area and the inherent change in pore morphology can be monitored by BET surface area measurement throughout the entire sintering process.

Conclusion, Ramifications and Scope

In conclusion, the major advantage of this invention resides in the ability to economically mass-produce homogeneous porous nanostructures from different sinterable materials, to precisely controlled and exacting specifications.

As can be understood from the preceding explanations, the limitations of the prior art to thin polymer or ceramic porous membranes are transcended with this invention. Ceramic or metallic porous nanostructures having a surface area in excess of 100 m2/g and with a precisely controlled open pore structure wherein the nanopores have a mean diameter of less than 50Å are well within the reach of this invention and without the need for costly investments in etching, photolithography or semiconductor manufacturing installations.

The practical uses of this invention are clearly broad in scope and universal in application and attempting to enumerate them all would not materially contribute to the description of this invention.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim as our invention:

1. A method for producing a body having substantially uniform, isotropically distributed controlled open nanoporosity, comprising the steps of:
   a. providing at least one type of sinterable precursor nanoparticulate material,
   b. attriting a predetermined volume of said precursor nanoparticulate material or materials under a protective non-reactive fluid blanket having substantially higher density than that of water and breaking up any aggregates and mechanically removing any adsorbed volatiles, moisture, atmospheric gases or contaminants from the surface of said nanoparticulates or from the fresh surfaces generated during attrition,
   c. separating any contaminants thus removed from the deaggregated nanoparticulates,
   d. removing the protective fluid blanket from the decontaminated nanoparticulates using vacuum distillation,
   e. desorbing the surface of the nanoparticulates by applying a sufficiently high vacuum,
   f. allowing a predetermined volume of a suitable surfactant to adsorb onto the surface of the said desorbed nanoparticulates such that substantially 25–50% of the nanoparticulates' surface will be coated with a monolayer of said surfactant,
   g. dispersing said surfactant-coated nanoparticulates in a predetermined volume of a suitable degradable organic thermoplastic binder to form a homogeneous thermoplastic compound,
   h. shaping said thermoplastic compound into a green body,
   i. extracting substantially all of the organic thermoplastic binder from said green body and sintering the thus obtained organic-free preforms to less than full density until the desired degree of open porosity is achieved.

2. The method of claim 1 wherein the method of sintering includes microwave sintering.

3. The method of claim 2 wherein the said nanoparticulate materials are selected from the class of metals and their alloys, ceramics and their alloys and mixtures of metals and ceramics and their alloys.

4. The method of claim 2 wherein the said degradable organic thermoplastic binder ingredients are selected from the class of polyolefins, waxes, plasticizers, greases, oils, surfactants and mixtures of these.

5. The method of claim 2 wherein the formation of aggregates is reduced or prevented.

6. The method of claim 2 wherein the pyrophoricity of nanoparticulates is controlled.

7. The method of claim 2 wherein excessive grain growth during sintering of green porous nanostructures is reduced or prevented.

8. The method of claim 2 wherein the fine-grained porous nanostructures have improved dimensional accuracy.

9. The method of claim 2 wherein the fine-grained porous nanostructures are produced by an economic manufacturing process which lends itself easily to automation and mass-production.

10. The method of claim 2, wherein said nanoparticulate materials are selected from the group consisting of metal oxides, carbides, borides, nitrides, silicides, aluminas, mullite, and zeolites.

11. The method of claim 1, wherein the fluid blanket is a nonaqueous organic heavy liquid.

12. The method of claim 1, wherein the fluid blanket has a low viscosity and low surface tension.

13. The method of claim 1, wherein attriting is interrupted or slowed down to allow dislodged gaseous contaminants to coalesce at or above the surface of the fluid blanket.

14. The method of claim 1, further comprising controlling the volume of the thermoplastic binder to control the amount of porosity of the body.

15. The method of claim 1, further comprising minimizing the volume of the thermoplastic binder.

16. The method of claim 1, further comprising controlling the number of estimated contact points between nanoparticles.

* * * * *